US012584006B2

(12) United States Patent
Pearson

(10) Patent No.: US 12,584,006 B2
(45) Date of Patent: Mar. 24, 2026

(54) BLENDS OF ETHYLENE VINYL ACETATE COPOLYMER AND ALPHA OLEFIN MALEIC ANHYDRIDE COPOLYMER AS HEAVY POUR POINT DEPRESSANTS

(71) Applicant: ECOLAB USA Inc., St. Paul, MN (US)

(72) Inventor: Alexander Coleman Pearson, Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 565 days.

(21) Appl. No.: 17/974,292

(22) Filed: Oct. 26, 2022

(65) Prior Publication Data

US 2023/0139145 A1 May 4, 2023

Related U.S. Application Data

(60) Provisional application No. 63/273,292, filed on Oct. 29, 2021.

(51) Int. Cl.

| | |
|---|---|
| ***C08L 23/24*** | (2006.01) |
| ***C08F 222/06*** | (2006.01) |
| ***C08L 23/0853*** | (2025.01) |
| ***C08L 23/26*** | (2006.01) |
| ***C10L 10/16*** | (2006.01) |

(52) U.S. Cl.

CPC ........ *C08L 23/0853* (2013.01); *C08F 222/06* (2013.01); *C08L 23/24* (2013.01); *C08L 23/26* (2013.01); *C10L 10/16* (2013.01); *C08L 2205/02* (2013.01)

(58) Field of Classification Search

CPC ........................................................ C10L 10/16

See application file for complete search history.

(56) References Cited

U.S. PATENT DOCUMENTS 5,857,287 A 1/1999 Schield et al.
2008/0178522 A1* 7/2008 Siggelkow .............. C10L 10/14 44/307
2015/0136301 A1* 5/2015 Cyman, Jr. ............ H01B 3/306 524/517
2020/0199468 A1* 6/2020 Gatt ...................... C10G 65/043
2020/0224113 A1* 7/2020 Li ......................... C10L 1/1852
2023/0138313 A1* 5/2023 Pearson .................. C10L 1/146 524/524

FOREIGN PATENT DOCUMENTS

JP S6332120 B2 6/1988

OTHER PUBLICATIONS

API Gravity flyer, Wikipedia (Year: NA).*
Soybean Oil flyer, CoreChem (Year: NA).*
International Search Report and Written Opinion issued in PCT/US2022/047904, ISA/European Patent Office, dated Jan. 13, 2023, 11 pages.

* cited by examiner

*Primary Examiner* — Irina Krylova

(74) *Attorney, Agent, or Firm* — Eric D. Babych; Barnes & Thornburg LLP

(57) ABSTRACT

A composition is provided that includes about 2 wt. % to about 25 wt. % of a copolymer including ethylene and vinyl acetate; about 2 wt. % to about 20 wt. % of a copolymer including an α-olefin and maleic anhydride; and about 55 wt. % to about 96 wt. % of a solvent. The composition can be used to decrease the pour point of a hydrocarbon, such as crude oil.

4 Claims, No Drawings

BLENDS OF ETHYLENE VINYL ACETATE COPOLYMER AND ALPHA OLEFIN MALEIC ANHYDRIDE COPOLYMER AS HEAVY POUR POINT DEPRESSANTS

TECHNICAL FIELD

The present disclosure generally relates pour point depressants for hydrocarbons. More particularly, the disclosure relates to a composition of ethylene vinyl acetate copolymer and α-olefin maleic anhydride copolymer.

BACKGROUND

Pour point depressants may be used to facilitate the flow of crude oil and other hydrocarbons. For example, hydrocarbon-based feedstocks may contain wax-like structures. The presence of these wax-like structures can result in solidifying or precipitating when the temperature drops, such as below about 0° C., although it can also happen at higher temperatures, such as about 40° C. As additional wax precipitates, the crystals grow and, finally, if the temperature is decreased far enough, the crystals will grow together to form a three-dimensional network that immobilizes the fuel or oil. This solidification process is sometimes referred to as gelation. The precipitation of the wax can cause problems during the recovery, transport, storage or use of the synthetic feedstocks. The precipitated wax-like materials can block filters, pumps, pipelines, and other installations or be deposited in tanks, thus entailing additional cleaning.

Hence, additives that can depress or lower the pour points to maintain the fluidity of the synthetic feedstocks (e.g., fuel or oil) at lower temperatures are desirable.

BRIEF SUMMARY

A composition is provided herein that includes about 2 wt % to about 25 wt % of a copolymer comprising ethylene and vinyl acetate; about 2 wt % to about 20 wt % of a copolymer comprising an α-olefin and maleic anhydride; and about 55 wt % to about 96 wt % of a solvent.

In some embodiments, the α-olefin and maleic anhydride copolymer is about 5% to 100% esterified. In some embodiments, the α-olefin and maleic anhydride copolymer is about 50% to about 100% amidated. In some embodiments, the composition comprises a greater weight percentage of the α-olefin and maleic anhydride copolymer than the copolymer of ethylene and vinyl acetate.

In some aspects, the copolymer comprising the ethylene and the vinyl acetate comprises a weight average molecular weight of about 20,000 to about 100,000 g/mol.

In some aspects, the copolymer comprising the α-olefin and maleic anhydride comprises a weight average molecular weight of from about 10,000 to about 70,000 g/mol.

In some aspects, the composition comprises about 2 wt % to about 8 wt % of the copolymer of ethylene and vinyl acetate.

In some aspects, the composition comprises about 18 wt % to about 22 wt % of the copolymer of ethylene and vinyl acetate.

In some aspects, the composition comprises about 12 wt % to about 16 wt % of the copolymer of an α-olefin and maleic anhydride.

In some aspects, the composition comprises about 16 wt % to about 20 wt % of the copolymer of an α-olefin and maleic anhydride.

In some aspects, the composition comprises about 2 wt % to about 10 wt % of the copolymer of an α-olefin and maleic anhydride.

In some aspects, the copolymer comprising the α-olefin and the maleic anhydride is a polymer of Formula II, wherein $R_1$ and $R_2$ are independently selected from a $C_8$ to $C_{40}$ alkyl group and n is an integer from 1 to 150.

Formula II

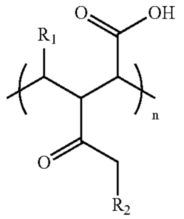

In some aspects, the copolymer comprising the α-olefin and the maleic anhydride is a polymer of Formula III:

Formula III

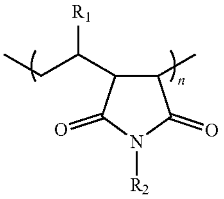

wherein $R_1$ and $R_2$ are independently selected from a $C_8$ to $C_{40}$ alkyl group and n is an integer from 1 to 150.

In some aspects, the composition comprises about 75 wt % to about 85 wt % of the solvent.

In some aspects, the solvent is selected from the group consisting of toluene, naphtha, kerosene, heavy aromatic naphtha, a de-aromatized aliphatic hydrocarbon, an alcohol (such as methanol, ethanol, etc.), and any combination thereof.

In some aspects, the solvent is selected from the group consisting of naphtha, heavy aromatic naphtha, and any combination thereof.

In some aspects, the solvent is naphtha.

In some aspects, the solvent is heavy aromatic naphtha.

In another aspect, a composition comprising a hydrocarbon is provided. The composition further comprises a copolymer of ethylene and vinyl acetate; a copolymer of an α-olefin and maleic anhydride; and a solvent. The composition comprises a greater weight percentage of the α-olefin and maleic anhydride copolymer than the copolymer of ethylene and vinyl acetate. The hydrocarbon is selected from the group consisting of topped crude oil, vacuum gas oil, a heavy distillate refiner product, slop oil, a fuel oil, and any combination thereof.

In some aspects, the copolymer of ethylene and vinyl acetate; the copolymer of an α-olefin and maleic anhydride; and the solvent comprise about 0.001 wt % to about 0.01 wt % of a composition.

In some aspects, the hydrocarbon has an API gravity of about 15 to about 55. In some aspects, the hydrocarbon has an API gravity of about 15 to about 55 and is not diesel, gasoline, or kerosene.

In another aspect, a method of decreasing the pour point of a hydrocarbon is provided. The method includes adding to the hydrocarbon a composition comprising about 2 wt % to about 25 wt % of a copolymer comprising ethylene and vinyl acetate; about 2 wt % to about 20 wt % of a copolymer comprising an α-olefin and maleic anhydride; and about 55 wt % to about 96 wt % of a solvent. In some embodiments, the α-olefin and maleic anhydride copolymer is about 5% to about 100% esterified.

In another aspect, a method of decreasing the pour point of a hydrocarbon is provided. The method comprises adding a composition to the hydrocarbon, wherein the composition comprises about 2 wt % to about 25 wt % of a copolymer comprising ethylene and vinyl acetate, about 2 wt % to about 20 wt % of a copolymer comprising an α-olefin and maleic anhydride, and about 55 wt % to about 96 wt % of a solvent. The α-olefin and maleic anhydride copolymer is about 50% to about 100% amidated and the hydrocarbon has an API gravity of about 15 to about 55 and is not diesel, gasoline, or kerosene.

In some aspects, the pour point of the crude oil decreases by about 10° F. to about 50° F.

Also provided herein is a use of a composition comprising a copolymer of ethylene and vinyl acetate; a copolymer of α-olefin and maleic anhydride; and a solvent for decreasing a pour point of a crude oil.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

The terms "polymer," "copolymer," "polymerize," "copolymerize," and the like include not only polymers comprising two monomer residues and polymerization of two monomers together, but also include (co)polymers comprising more than two monomer residues and polymerizing more than two monomers together. For example, a polymer as disclosed herein includes a terpolymer, a tetrapolymer, polymers comprising more than four different monomers, as well as polymers comprising, consisting of, or consisting essentially of two different monomer residues. Additionally, a "polymer" as disclosed herein may also include a homopolymer, which is a polymer comprising a single type of monomer unit.

Unless specified differently, the polymers of the present disclosure may be linear, branched, crosslinked, structured, synthetic, semi-synthetic, natural, and/or functionally modified. A polymer of the present disclosure can be in the form of a solution, a dry powder, a liquid, or a dispersion, for example.

The term "pour point" is the lowest temperature at which a liquid will pour or flow under a specific set of conditions. Examples of pour point standards include ASTM D97-11, D5853-11, and D5949-10.

The term "pour point depressants" are molecules that reduce or inhibit wax crystal formation in feedstocks, such as feedstocks derived from plastic, resulting in lower pour point and improved low or cold temperature flow performance.

The term "synthetic feedstock" refers to hydrocarbons obtained from treatment or processes on plastics.

Described are compositions and methods that improve the cold flow properties of hydrocarbons, such as synthetic feedstocks, for plastics. The cold flow properties can be improved by additives that prevent the formation of wax-like structures and lower the temperature at which the synthetic feedstock solidifies. This helps to ensure uninterrupted flow of the synthetic feedstock. Such additives are referred to as pour point depressants or flow improvers.

A composition is provided herein that includes about 2 wt % to about 25 wt % of a copolymer comprising ethylene and vinyl acetate; about 2 wt % to about 20 wt % of a copolymer comprising an α-olefin and maleic anhydride; and about 55 wt % to about 96 wt % of a solvent. In some embodiments, the α-olefin and maleic anhydride copolymer is about 5% to about 100% esterified. In some embodiments, the α-olefin and maleic anhydride copolymer is about 50% to about 100% amidated.

Copolymers comprising ethylene and vinyl acetate can be prepared by copolymerizing ethylene with vinyl acetate. Other monomers can be copolymerized with ethylene and vinyl acetate. In some aspects, the copolymer comprising ethylene and vinyl acetate consists of the monomers ethylene and vinyl acetate.

In some aspects, the vinyl acetate in the ethylene vinyl acetate copolymer is from about 5-60 wt % of the total copolymer; or from about 10 to about 25 wt %; from about 10 to about 20 wt %; from about 10 to about 50 wt %; from about 25 to about 40 wt %; from about 25 to about 50 wt %; from about 15 to about 25 wt %; from about 25 wt % to about 35 wt %; or from about 30 wt % to about 35 wt %.

In some aspects, the copolymer of ethylene and vinyl acetate has a weight average molecular weight from about 20,000 to about 100,000 g/mol; from about 25,000 to about 85,000 g/mol; or from about 45,000 to about 55,000 g/mol. In some aspects, the weight average molecular weight of the copolymer comprising ethylene and vinyl acetate can be about 25,000 g/mol; about 28,000 g/mol; about 45,000 g/mol; about 48,000 g/mol; about 56,000 g/mol; about 58,000 g/mol; about 65,000 g/mol; or about 83,000 g/mol. In some embodiments, the molecular weight can be determined by gel permeation chromatography (GPC).

In some aspects, the composition comprises about 2 wt % to about 8 wt % of the copolymer of ethylene and vinyl acetate. In some aspects, the composition comprises about 2 wt %, about 3 wt %, about 4 wt %, about 5 wt %, about 6 wt %, about 7 wt % or about 8 wt % of the copolymer of ethylene and vinyl acetate.

In some aspects, the composition comprises about 18 wt % to about 22 wt % of the copolymer of ethylene and vinyl acetate. In some aspects, the composition comprises about 18 wt %, about 19 wt %, about 20 wt %, about 21 wt %, or about 22 wt % of the copolymer of ethylene and vinyl acetate.

The copolymer comprising an α-olefin and maleic anhydride can be prepared by copolymerizing an α-olefin with maleic anhydride. Other monomers can be copolymerized with an α-olefin and maleic anhydride. In some aspects, the copolymer comprising an α-olefin and maleic anhydride consists of the monomers of α-olefin and maleic anhydride.

The α-olefin monomer can have the structure of the following formula:

where $R_1$ is a linear or branched unsubstituted $C_6$ to $C_{50}$ alkyl group.

In some aspects, $R_1$ is a linear or branched unsubstituted $C_{20}$ to $C_{24}$ alkyl group. In some aspects, $R_1$ is a linear $C_{10}$ to $C_{30}$ alkyl group. In some aspects, $R_1$ is a branched $C_{10}$ to $C_{30}$ alkyl group. In some aspects, $R_1$ is a linear $C_{20}$ to $C_{30}$ alkyl group. In some aspects, $R_1$ is a linear $C_{20}$ to $C_{24}$ alkyl group.

In some aspects, the copolymer comprising an α-olefin and maleic anhydride has the structure of Formula I:

Formula I

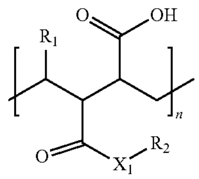

where $R_1$ is a linear or branched unsubstituted $C_6$ to $C_{50}$ alkyl group; $R_2$ is a linear or branched unsubstituted $C_6$ to $C_{50}$ alkyl group; $X_1$ is NH or O and n is an integer from 1 to 150, such as from 1 to about 25, about 25 to about 50, about 50 to about 75, about 75 to about 100, or about 100 to about 150.

In some aspects of Formula I, $R_1$ is a linear or branched unsubstituted $C_{20}$ to $C_{24}$ alkyl group. In some aspects, $R_1$ is a linear $C_{10}$ to $C_{30}$ alkyl group. In some aspects, $R_1$ is a branched $C_{10}$ to $C_{30}$ alkyl group. In some aspects, $R_1$ is a linear $C_{20}$ to $C_{30}$ alkyl group. In some aspects, $R_1$ is a linear $C_{20}$ to $C_{24}$ alkyl group.

In some aspects, $R_2$ is a linear or branched unsubstituted $C_{10}$ to $C_{30}$ alkyl group. In some aspects, $R_2$ is a linear $C_{12}$-$C_{20}$ alkyl group, a linear $C_{14}$ alkyl group, a linear $C_{16}$ alkyl group, a linear $C_{18}$ alkyl group, or a linear $C_{20}$ alkyl group.

In some aspects, $X_1$ is NH. In some aspects, $X_1$ is O.

The $R_2$ group and $X_1$ atom depend on the post-modification conditions of the copolymer of the α-olefin and the maleic anhydride. In some aspects, the maleic anhydride residue is reacted with about 0.01 to 2.0 equivalents of a $C_{20}$-$C_{28}$ alkanol or amine per equivalent of anhydride.

In some embodiments, the compound of Formula I comprises:

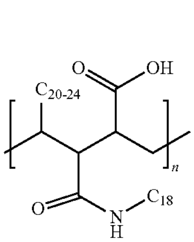

wherein n is an integer from 1 to about 150.

In some aspects, the α-olefin and maleic anhydride copolymer can have the structure of Formula II:

Formula II

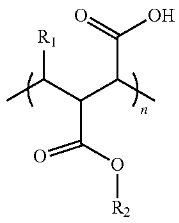

wherein n is an integer from 1 to 150, such as from 1 to about 25, about 25 to about 50, about 50 to about 75, about 75 to about 100, or about 100 to about 150, and wherein $R_1$ and $R_2$ are independently selected from a $C_8$ to $C_{40}$ alkyl group. For example, $R_1$ may be selected from a $C_{15}$ to $C_{35}$ alkyl group, a $C_{20}$ to $C_{30}$ alkyl group or a $C_{24}$ to $C_{28}$ alkyl group. $R_2$ may be selected from a $C_{10}$ to $C_{35}$ alkyl group, a $C_{15}$ to $C_{30}$ alkyl group, a $C_{20}$ to $C_{30}$ alkyl group, or a $C_{20}$ to $C_{28}$ alkyl group.

In some aspects, the copolymer comprising the α-olefin and the maleic anhydride is a polymer of Formula III:

Formula III

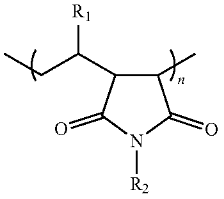

wherein $R_1$ and $R_2$ are independently selected from a $C_8$ to $C_{40}$ alkyl group and n is an integer from 1 to 150, such as from 1 to about 25, about 25 to about 50, about 50 to about 75, about 75 to about 100, or about 100 to about 150. $R_1$ may be selected from a $C_{15}$ to $C_{35}$ alkyl group, a $C_{20}$ to $C_{30}$ alkyl group or a $C_{24}$ to $C_{28}$ alkyl group. $R_2$ may be selected from a $C_{10}$ to $C_{35}$ alkyl group, a $C_{15}$ to $C_{30}$ alkyl group, a $C_{20}$ to $C_{30}$ alkyl group, or a $C_{20}$ to $C_{28}$ alkyl group.

In some embodiments, the α-olefin and maleic anhydride copolymer is about 5% to about 100% esterified. For example, the α-olefin and maleic anhydride copolymer may be about 10% to about 90% esterified, about 20% to about 80% esterified, about 30% to about 70% esterified, about 40% to about 60% esterified or about 50% esterified. An example of an esterified structure can be seen in Formula II of the present disclosure.

In some embodiments, the α-olefin and maleic anhydride copolymer is about 50% to about 100% amidated. For example, the α-olefin and maleic anhydride copolymer may be about 60% to about 100% amidated, about 70% to about 100% amidated, about 80% to about 100% amidated, or about 90% to about 100% amidated. An example of an amidated structure can be seen in Formula I of the present disclosure.

In some embodiments, the olefin is linear and/or contains linear hydrocarbon chains, such as alkyl or alkaryl chains attached to the double bond, then polymers of the olefin including copolymers of the olefin have pendant side chains. For example, polymers of linear alpha olefins having 14 carbon atoms or more, when polymerized and/or copolymerized, impart linear side chains of 12 carbon atoms or more to the resulting polymer. Long-chain alkenes, wherein the double bond is not in the 1-position, are also suitable because when polymerized, the resulting polymer of the alkene monomer has linear side chains of at least 12 carbon atoms. Polymers of long chain alkenes with 12 carbon atoms or more on one side of the double bond and 12 carbon atoms or more on the opposing side of the double bond, when polymerized and/or copolymerized, form brush polymers. Such brush polymers have sets of opposing pendant side chains. Both brush and comb polymers are useful in the disclosed embodiments.

In some aspects, the alpha-olefin maleic anhydride copolymer has a weight average molecular weight of from about 10,000 to about 70,000 g/mol; about 10,000 to about 55,000 g/mol; about 20,000 to about 50,000 g/mol; about 20,000 to about 70,000 g/mol; or from about 15,000 to about 35,000 g/mol. In some aspects, the weight average molecular weight can be determined by gel permeation chromatography (GPC).

In some aspects, the composition comprises about 12 wt % to about 16 wt % of the copolymer of an α-olefin and maleic anhydride. In some aspects, the composition comprises about 12 wt %, about 13 wt %, about 14 wt %, about 15 wt %, or about 16 wt % of the copolymer of an α-olefin and maleic anhydride.

In some aspects, the composition comprises about 16 wt % to about 20 wt % of the copolymer of an α-olefin and maleic anhydride. In some aspects, the composition comprises about 16 wt %, about 17 wt %, about 18 wt %, about 19 wt %, or about 20 wt % of the copolymer of an α-olefin and maleic anhydride.

In some aspects, the composition comprises about 2 wt % to about 10 wt % of the copolymer of an α-olefin and maleic anhydride. In some aspects, the composition comprises about 2 wt %, about 3 wt %, about 4 wt %, about 5 wt %, about 6 wt %, about 7 wt %, about 8 wt %, about 9 wt % or about 10 wt % of the copolymer of an α-olefin and maleic anhydride.

In some embodiments, the composition comprises a greater weight percentage of the α-olefin and maleic anhydride copolymer than the copolymer of ethylene and vinyl acetate. For example, if the composition comprises 10 wt % of the α-olefin and maleic anhydride copolymer, then the composition includes less than 10 wt % of the copolymer comprising ethylene and vinyl acetate.

The composition also includes a solvent. Examples of solvents include, but are not limited to, toluene, naphtha, kerosene, heavy aromatic naphtha, an alcohol, and any combination thereof. In some aspects, the solvent is naphtha, heavy aromatic naphtha, or any combination thereof. In some aspects, the solvent is naphtha. In some aspects, the solvent is heavy aromatic naphtha.

In some aspects, the composition comprises about 75 wt % to about 85 wt % of the solvent. In some aspects, the composition comprises about 75 wt %, about 76 wt %, about 77 wt %, about 78 wt %, about 79 wt %, about 80 wt %, about 81 wt %, about 82 wt %, about 83 wt %, about 84 wt %, or about 85 wt % of the solvent.

Preparation of pour point depressant polymers may be made by any method known in the art, such as by solution polymerization of free radical initiation or high pressure polymerizations that may be carried out in an autoclave or suitable reactor. For example, preparation of alpha-olefin with an ethylenically unsaturated carboxylic acid (e.g., alpha-olefin maleic anhydride copolymers) is known in the art. For instance, see U.S. Pat. No. 5,441,545, which is incorporated herein by reference.

In some embodiments, the pour point depressant can include one or more additional components, such as other pour point dispersants, paraffin inhibitors, asphaltene dispersants, wax dispersants, tar dispersants, neutralizers (e.g. amine neutralizers), surfactants, biocides, preservatives, stabilizers, or any combination thereof.

Wax dispersants can stabilize paraffin crystals that have formed and prevent them from sedimenting. The wax dispersants used may be, for example, alkylphenols, alkylphenol-formaldehyde resins or dodecylbenzenesulfonic acid.

In another aspect, a composition comprising a hydrocarbon is provided. The composition further comprises a copolymer of ethylene and vinyl acetate; a copolymer of an α-olefin and maleic anhydride; and a solvent.

The hydrocarbon is selected from the group consisting of topped crude oil, vacuum gas oil, a heavy distillate refiner product, slop oil, a fuel oil, and any combination thereof. In some aspects, the hydrocarbon is petroleum-based having an API gravity of about 15-55. In some aspects, the hydrocarbon is not diesel, gasoline, or kerosene. Crude oil is generally known to be a naturally occurring hydrocarbon mixture, usually in a liquid sate, which may include additional components, such as sulfur, nitrogen, oxygen, metals, and other elements.

In some aspects, the hydrocarbon comprises a synthetic feedstock resulting from a pyrolysis reaction. In some aspects, the hydrocarbon comprises pyrolysis effluent.

The pyrolysis reaction produces a range of hydrocarbon products from gases (at temperatures from about 10 to about 50° C. and about 0.5 to about 1.5 atmospheric pressure and having 5 carbons or less); modest boiling point liquids (like gasoline (about 40 to about 200° C.) or diesel fuel (about 180 to about 360° C.); a higher (e.g., at about 250 to about 475° C.) boiling point liquid (oils and waxes), and some solid residues, commonly referred to as char. Char is the material that is left once the pyrolytic process is complete and the fuel recovered. Char contains the additives and contaminants that enter the system as part of the feedstock. The char can be a powdery residue or substance that is more like sludge with a heavy oil component. Glass, metal, calcium carbonate/oxide, clay and carbon black are just a few of the contaminants and additives that will remain after the conversion process is complete and become part of the char.

Various plastic types, such as thermoplastic and thermoset waste plastics, and recycled plastic oils, can be used in the above-described process. The types of plastics commonly encountered in waste-plastic feedstock include, without limitation, low-density polyethylene, high-density polyethylene, polypropylene, polystyrene, the like, and combinations thereof.

In some embodiments, the pyrolysis of plastic results in synthetic feedstocks that include 2-30% gas ($C_1$-$C_4$ hydrocarbon); (2) 10-50% oil ($C_5$-$C_{15}$ hydrocarbon); (3) 10-40% waxes (≥$C_{16}$ hydrocarbon); and (4) 1-5% char and tar.

The hydrocarbons that derive from the pyrolysis of waste plastic are a mixture of alkanes, alkenes, olefins and diolefins. The olefin group is generally between $C_1$ and $C_2$, i.e., alpha-olefin, but some alk-2-ene is also produced. The diene is generally in the alpha and omega position, i.e., alk-α,ω-diene. In some embodiments, the pyrolysis of plastic produces paraffin compounds, isoparaffins, olefins, diolefins, naphthenes and aromatics.

In some aspects, the percentage of 1-olefins in the pyrolysis effluent is from about 25 to about 75 wt % or from about 40 to about 60 wt %. Pyrolysis conditions include a temperature from about 500 to about 700° C. or from about 600 to about 700° C.

Depending on the processing conditions, synthetic feedstock can have characteristics similar to crude oil from petroleum sources but can also have ash and wax of different ranges. In some aspects, the synthetic feedstock derived from waste plastic contains waxy hydrocarbons from $C_{16}$-$C_{36}$; $C_{16}$-$C_{20}$; $C_{21}$-$C_{29}$; or $C_{30}$-$C_{36}$. In other aspects, the synthetic feedstock derived from waste plastic contains waxy hydrocarbons with the $C_{16}$-$C_{20}$ fraction representing about 50-60 wt % of the wax molecules, the $C_{21}$-$C_{29}$ fraction being about 40-50 wt % of the wax molecules and $C_{30}$+ fraction being less than about 2 wt % of the wax fraction; the waxy fraction is about 10-20 wt % of the recovered synthetic feedstock fraction.

In still other aspects, the synthetic feedstocks have about 15-20 wt % $C_9$-$C_{16}$; about 75-87 wt % $C_{16}$-$C_{29}$; and about 2-5 wt % $C_{30}$+, where the carbon chains are predominantly a mixture of alkanes, alkenes and diolefins. In other aspects, the synthetic feedstocks have about 10 wt %<$C_{12}$, about 25 wt % $C_{12}$-$C_{20}$, about 30 wt % $C_{21}$-$C_{40}$ and about 35 wt %>$C_{41}$.

Unlike the synthetic feedstock derived from plastics, conventional crude oil that suffers from pour point issues has a broad range of hydrocarbon species where the non-waxy components may help offset some of the waxy nature of these troublesome crude oils. In a conventional waxy crude oil, the waxy components range from $C_{16}$ to $C_{80}$+. In one example of a crude, the waxy molecules with a carbon chain range of $C_{22}$-$C_{40}$, display a roughly Gaussian distribution and the majority of the waxy molecules were in the $C_{28}$-$C_{36}$ range. In another example of a crude, the waxy carbon chain length ranged from $C_{15}$ to $C_{110}$, the distribution can be bimodal with the majority of the waxy molecules being in the $C_{24}$ to $C_{28}$ or $C_{36}$ to $C_{52}$ range.

While there are known dewaxing methods for reducing waxy feeds, either by solvent removal or catalytic dewaxing or isomerization, most of these processes are expensive. In some embodiments, the compositions disclosed herein are pour point depressants that lower pour points of synthetic feedstocks derived from plastics (e.g., waste plastic).

In some aspects, the synthetic feedstock composition has waxy constituents that can precipitate from the synthetic feedstock composition at a temperature greater than its desired or intended storage, transport, or use temperature. In some aspects, the synthetic feedstock composition can have a wax content greater than about 1 wt %; greater than about 5 wt %; or greater than about 10 wt %. In some aspects, the wax content in the synthetic feedstocks is about 5-40 wt %; about 5-30 wt %; about 10-25 wt %; about 15-20 wt %; about 10-20 wt %; or about 10-30 wt %.

In the embodiment where the composition includes a hydrocarbon, the copolymer of ethylene and vinyl acetate; the copolymer of an α-olefin and maleic anhydride; and the solvent comprise, in total, about 0.001 wt % to about 0.01 wt % of the composition.

In another aspect, a method of decreasing the pour point of a hydrocarbon is provided. The method includes adding to the hydrocarbon a composition comprising about 2 wt % to about 25 wt % of a copolymer comprising ethylene and vinyl acetate; about 2 wt % to about 20 wt % of a copolymer comprising an α-olefin and maleic anhydride; and about 55 wt % to about 96 wt % of a solvent.

In some aspects, the pour point of the crude oil decreases by about 10° F. to about 50° F. In some aspects, the pour point of the crude oil decreases by about 10° F., about 15° F., about 20° F., about 25° F., about 30° F., about 35° F., about 40° F., about 45° F., or about 50° F.

The method of applying the pour point depressant to the hydrocarbon, such as a synthetic feedstock, is not particularly limited. One of skill will appreciate that the synthetic feedstock additives, such as the pour point depressant, are conventionally added by using available equipment including e.g., pipes, mixers, pumps, tanks, injection ports, and the like.

In some aspects, the pour point depressant is added into a synthetic feedstock obtained from plastics. In other aspects, the pour point depressant is added to a synthetic feedstock that contains waxes. In still other aspects, any composition disclosed herein is added to a synthetic feedstock that contains waxes, char and tar. In some aspects, any composition disclosed herein is added to a synthetic feedstock that contains waxes having $C_{16}$-$C_{36}$, char and tar. In some aspects, any composition disclosed herein is a suitable pour point depressant for synthetic feedstock having about 15-20 wt % $C_9$-$C_{16}$; about 75-87 wt % $C_{16}$-$C_{29}$; about 2-5 wt % $C_{30}$+, where the carbon chains are predominantly a mixture of alkanes, alkenes and diolefins. In still other aspects, any composition disclosed herein is a suitable pour point depressant for synthetic feedstock having about 10 wt %<$C_{12}$, about 25 wt % $C_{12}$-$C_{20}$, about 30 wt % $C_{21}$-$C_{40}$ and about 35 wt %>$C_{41}$.

The effective amount of the composition used depends on the type of synthetic feedstock obtained from the plastic type processed, the temperature and other characteristics of the process. In some aspects, the composition is added in an amount from about 50 ppm to about 10,000 ppm; about 50 ppm to about 5,000 ppm; about 550 ppm to about 5,000 ppm; about 250 ppm to about 1000 ppm; about 50 ppm to about 1,000 ppm; about 150 to about 450 ppm; or about 50 ppm to about 500 ppm in the synthetic feedstock.

Flow properties of the synthetic feedstock can be evaluated by any known method or test. For example, pour points can be measured according to ASTM D97.

In some aspects, the synthetic feedstocks with the composition have pour points (measured under ASTM D97) of less than about −24° C., less than about −20° C.; less than about −10° C., or less than about −5° C. Such synthetic feedstocks continue to flow, thereby being allowed to be poured, pumped or transferred at temperatures between, for example, about −40 to about 20° C. In some aspects, the hydrocarbons containing the compositions flow, and thus are pourable or pumpable, at temperatures as low as about −40° C., or about 20 to about −40° C.; about −5 to about −40° C., about −10 to about −40° C., about −15 to about −40° C., about −20 to about −40° C., about −25 to about −40° C., or about −30 to about −40° C.

In some aspects, the compositions can reduce the pour points by about 3 to about 42° C.; about 3 to about 30° C.; about 3 to about 20° C.; about 10 to about 20° C.; about 3 to about 20° C.; about 3 to about 15° C.; about 3 to about 10° C.; or about 3 to about 5° C.

In some aspects, the compositions at about 250-450 ppm reduce the pour points by about 3 to about 42° C.; about 3 to about 30° C.; about 3 to about 20° C.; about 10 to about 20° C.; about 3 to about 20° C.; about 3 to about 15° C.; about 3 to about 10° C.; or about 3 to about 5° C.

EXAMPLES

Example 1

Various compositions were added to different feedstocks: fuel oil, vacuum gas oil, and topped crude oil. The active component of each additive used can be seen in the list below.

Formulation 1: About a 20 wt % active solution of an ethylene vinyl acetate copolymer with a melt index of 45 and vinyl acetate content of 33 wt % dissolved in aromatic 150 solvent. The copolymer had a weight average molecular weight of about 48,000 g/mol.

Formulation 2: About a 68 wt % active solution of a $C_{24}$-$C_{28}$ α-olefin and maleic anhydride copolymer reacted with a $C_{20}$-$C_{28}$ alcohol mixture in aromatic 150 solvent. The weight average molecular weight of the polymer was about 44,000 g/mol.

Formulation 3: About a 68 wt % active solution of a $C_{24}$-$C_{28}$ and $C_{30+}$ α-olefin and maleic anhydride copolymer reacted with a $C_{20}$-$C_{28}$ alcohol mixture in aromatic 150 solvent. The weight average molecular weight of the polymer was about 50,000 g/mol.

Formulation 4: An ethylene vinyl acetate copolymer with about 47% active. The copolymer had a weight average molecular weight of about 48,000 g/mol.

Formulation 5: About a 50 wt % active solution of an α-olefin succinimide copolymer formed by the reaction of a $C_{20}$-$C_{24}$ α-olefin and maleic anhydride copolymer and a hydrogenated tallow amine.

Formulation 6: Formulation 4 blended with Formulation 5 (about 25% active).

Formulation 7: A blend of Formulation 2, Formulation 1, and Solvent (26:26:48) (about 23% active).

Formulation 8: Formulation 1 blended with Formulation 3 (about 18% active).

Tables 1-5 show the performance of various compositions. These data demonstrate that the compositions disclosed herein exhibit synergism. Ethylene vinyl acetate copolymers are highly effective pour point depressants on an actives basis but can decompose to acetic acid at high temperatures in refinery environments, leading to a corrosion risk. α-olefin and maleic anhydride copolymers are not corrosive but are often less effective pour point depressants on a percent actives basis. Surprisingly, on a percent actives basis, mixtures of ethylene vinyl acetate and α-olefin/maleic anhydride copolymers show similar performance to the ethylene vinyl acetate copolymers alone. These mixtures are desirable for their excellent pour point depressant properties and reduced corrosion risk due to lower total ethylene vinyl acetate content.

For example, in Table 2, 1000 ppm of Formulation 8 is made up of about 40 ppm and about 141 ppm active of Formulation 1 and Formulation 3, respectively, and reaches a pour point of about 35° F. If this result is compared to the data points of Formulation 1 at about 50 ppm active and Formulation 3 at about 176 ppm active, it can be seen that a pour point of only about 50° F. is reached even though the respective amounts of Formulation 1 and Formulation 3 are similar to those present in Formulation 8. For the α-olefin and maleic anhydride copolymer of Formulation 3 to achieve a pour point of at least about 35° F. by itself, a dosage of at least about 703 ppm active was required, an amount nearly 7 times greater than the amount of α-olefin and maleic anhydride copolymer used in Formulation 8.

As summarized in the paragraphs above, the synergy should be seen through the lens of improving α-olefin and maleic anhydride copolymer performance while minimizing ethylene vinyl acetate concentration due to the problems it can cause in a refinery.

TABLE 1

| Novoshakhtinsk Topped Crude Oil | | | | |
|---|---|---|---|---|
| Additive(s) | Pour Point (° F.) | Active Concentration (ppm) | Effective Active Concentration Formulation 1 (ppm) | Effective Active Concentration Formulation 2 (ppm) |
| Blank | 75 | | — | — |
| Formulation 1 | 70 | 50 | — | — |
| Formulation 1 | 60 | 100 | — | — |
| Formulation 2 | 65 | 172 | — | — |
| Formulation 2 | 60 | 344 | — | — |
| Formulation 2 | 45 | 1377 | — | — |
| Formulation 7 | 65 | 116 | 26 | 90 |
| Formulation 7 | 45 | 462 | 104 | 358 |

TABLE 2

| Kirishi Topped Crude Oil | | | | |
|---|---|---|---|---|
| Additive(s) | Pour Point (° F.) | Active Concentration (ppm) | Effective Active Concentration Formulation 1 (ppm) | Effective Active Concentration Formulation 3 (ppm) |
| Blank | 65 | | — | — |
| Formulation 1 | 55 | 30 | — | — |
| Formulation 1 | 50 | 50 | — | — |
| Formulation 1 | 35 | 167 | — | — |
| Formulation 1 | 30 | 200 | — | — |
| Formulation 3 | 50 | 176 | — | — |
| Formulation 3 | 30 | 703 | — | — |
| Formulation 8 | 55 | 45 | 10 | 35 |
| Formulation 8 | 35 | 181 | 40 | 141 |

TABLE 3

| Fuel Oil | | | | |
|---|---|---|---|---|
| Additive(s) | Pour Point (° F.) | Active Concentration (ppm) | Effective Active Concentration Formulation 1 (ppm) | Effective Active Concentration Formulation 3 (ppm) |
| Blank | 20 | | — | — |
| Formulation 1 | 20 | 100 | — | — |
| Formulation 1 | 15 | 400 | — | — |
| Formulation 3 | 20 | 352 | — | — |
| Formulation 3 | 20 | 1,406 | — | — |
| Formulation 8 | 20 | 90.3 | 20 | 70 |
| Formulation 8 | 10 | 361 | 80 | 281 |

TABLE 4

| Vacuum Gas Oil | | | | |
|---|---|---|---|---|
| Additive(s) | Pour Point (° F.) | Active Concentration (ppm) | Effective Active Concentration Formulation 1 (ppm) | Effective Active Concentration Formulation 3 (ppm) |
| Blank | 85 | | | |
| Formulation 1 | 70 | 20 | — | — |
| Formulation 1 | 60 | 40 | — | — |
| Formulation 1 | 45 | 200 | — | — |
| Formulation 2 | 50 | 344 | — | — |
| Formulation 2 | 45 | 688 | — | — |
| Formulation 2 | 45 | 1,033 | — | — |
| Formulation 8 | 55 | 90 | 20 | 70 |

TABLE 4-continued

| Vacuum Gas Oil | | | | |
|---|---|---|---|---|
| Additive(s) | Pour Point (° F.) | Active Concentration (ppm) | Effective Active Concentration Formulation 1 (ppm) | Effective Active Concentration Formulation 3 (ppm) |
| Formulation 8 | 55 | 181 | 40 | 141 |
| Formulation 8 | 45 | 271 | 60 | 211 |

TABLE 5

| Vacuum Gas Oil | | | | |
|---|---|---|---|---|
| Additive(s) | Pour Point (° F.) | Active Concentration (ppm) | Effective Active Concentration (ppm) Formulation 5 (ppm) | Effective Active Concentration (ppm) Formulation 4 (ppm) |
| Blank | 85 | 0 | — | — |
| Formulation 5 | 65 | 40 | — | — |
| Formulation 5 | 45 | 200 | — | — |
| Formulation 4 | 80 | 200 | — | — |
| Formulation 6 | 50 | 200 | 40 | 200 |

Example 2

Various ethylene vinyl acetate polymers were tested having different weight average molecular weights to determine the effect of molecular weight on pour point depression. Table 6 shows the molecular weights, weight % vinyl acetate, and melt indices of different ethylene vinyl acetate polymers. Table 7 shows the effect of various compositions on the pour point. The percentages are in weight percent.

TABLE 6

| EVA | Weight Average Molecular Weight | % Vinyl Acetate | Melt Index |
|---|---|---|---|
| EVA 1 | 25,000 | 28 | 800 |
| EVA 2 | 27,421 | 28 | 420 |
| EVA 3 | 45,500 | 42 | 60 |
| EVA 4 | 48,000 | 33 | 45 |
| EVA 5 | 56,640 | 28 | 5 |
| EVA 6 | 58,314 | 28 | 25 |
| EVA 7 | 65,158 | 28 | 3 |
| EVA 8 | 83,094 | 24 | 3 |

TABLE 7

| No. | Sample | Total Dose (ppm) | AOMA (ppm) | EVA (ppm) | Pour Point (° C.) |
|---|---|---|---|---|---|
| 0 | Untreated Oil | 0 | 0 | 0 | 24 |
| 1 | Formulation 3 | 100 | 70 | 0 | 21 |
| 2 | Formulation 3 | 200 | 141 | 0 | 21 |
| 3 | 20% Formulation 3:4% EVA 7 | 500 | 70 | 20 | 18 |
| 4 | 20% Formulation 3:4% EVA 7 | 1,000 | 141 | 40 | 9 |
| 5 | 20% EVA 7 | 100 | 0 | 20 | 21 |
| 6 | 20% EVA 7 | 200 | 0 | 40 | 21 |
| 7 | 20% Formulation 3:4% EVA 2 | 500 | 70 | 20 | 21 |
| 8 | 20% Formulation 3:4% EVA 2 | 1,000 | 141 | 40 | 15 |

TABLE 7-continued

| No. | Sample | Total Dose (ppm) | AOMA (ppm) | EVA (ppm) | Pour Point (° C.) |
|---|---|---|---|---|---|
| 9 | 20% EVA 2 | 100 | 0 | 20 | 24 |
| 10 | 20% EVA 2 | 200 | 0 | 40 | 21 |
| 11 | 20% Formulation 3:4% EVA 1 | 500 | 70 | 20 | 21 |
| 12 | 20% Formulation 3:4% EVA 1 | 1,000 | 141 | 40 | 18 |
| 13 | 20% EVA 1 | 100 | 0 | 20 | 24 |
| 14 | 20% EVA 1 | 200 | 0 | 40 | 21 |
| 15 | 20% Formulation 3:4% EVA 8 | 500 | 70 | 20 | 18 |
| 16 | 20% Formulation 3:4% EVA 8 | 1,000 | 141 | 40 | 15 |
| 17 | 20% EVA 8 | 100 | 0 | 20 | 21 |
| 18 | 20% EVA 8 | 200 | 0 | 40 | 21 |
| 19 | 20% Formulation 3:4% EVA 4 (Formulation 8) | 500 | 70 | 20 | 21 |
| 20 | 20% Formulation 3:4% EVA 4 (Formulation 8) | 1,000 | 141 | 40 | 12 |
| 21 | 20% EVA 4 | 100 | 0 | 20 | 24 |
| 22 | 20% EVA 4 | 200 | 0 | 40 | 21 |
| 23 | 20% Formulation 3:4% EVA 3 | 500 | 70 | 20 | 21 |
| 24 | 20% Formulation 3:4% EVA 3 | 1,000 | 141 | 40 | 21 |
| 25 | 20% EVA 3 | 100 | 0 | 20 | 24 |
| 26 | 20% EVA 3 | 200 | 0 | 40 | 24 |

Throughout the examples of the present application, "EVA" refers to ethylene vinyl acetate and "AOMA" refers to a polymer comprising an α-olefin and maleic anhydride.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by,"

is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A composition for lowering a pour point of a hydrocarbon, comprising:

about 20 ppm to about 40 ppm of a copolymer of ethylene and vinyl acetate, wherein the copolymer of ethylene and vinyl acetate comprises a weight average molecular weight of about 25,000 Da to about 85,000 Da and a vinyl acetate content of about 28 wt. % to about 42 wt. %;

about 70 ppm to about 141 ppm of a reaction product of a copolymer of a $C_{24}$-$C_{28}$ and $C_{30+}$ α-olefin and maleic anhydride with a $C_{20}$-$C_{28}$ alcohol mixture; and a solvent comprising a remainder of the composition, based on a total amount of about 500 ppm to about 1000 ppm of the composition, wherein the solvent is selected from the group consisting of toluene, naphtha, kerosene, heavy aromatic naphtha, a de-aromatized aliphatic hydrocarbon, an alcohol, and any combination thereof, wherein the composition in the amount of about 500 ppm to about 1,000 ppm is combined with a hydrocarbon, wherein the hydrocarbon is selected from the group consisting of topped crude oil, crude oil, vacuum gas oil, a heavy distillate refiner product, slop oil, a fuel oil, and any combination thereof, and further wherein the composition lowers the pour point of the hydrocarbon by about 3° C. to about 15° C.

2. The composition of claim 1, wherein the hydrocarbon has an API gravity of about 15 to about 55 and is not diesel, gasoline, or kerosene.

3. A method of decreasing the pour point of a hydrocarbon, comprising:

adding the composition of claim 1 to the hydrocarbon.

4. A method of decreasing a pour point of a hydrocarbon, comprising:

adding from about 250 ppm to about 450 ppm of a composition to the hydrocarbon, the composition comprising:

about 2 wt. % to about 8 wt. % of a copolymer of ethylene and vinyl acetate, wherein the copolymer of ethylene and vinyl acetate comprises a weight average molecular weight of about 25,000 Da to about 85,000 Da and a vinyl acetate content of about 28 wt. % to about 42 wt. %;

about 16 wt. % to about 20 wt. % of a reaction product of a $C_{20}$-$C_{24}$ α-olefin and maleic anhydride copolymer with a hydrogenated tallow amine; and about 75 wt. % to about 82 wt. % of a solvent, wherein the solvent is selected from the group consisting of toluene, naphtha, kerosene, heavy aromatic naphtha, a de-aromatized aliphatic hydrocarbon, an alcohol, and any combination thereof, wherein the α-olefin and maleic anhydride copolymer is about 50% to about 100% amidated, wherein the hydrocarbon is selected from the group consisting of topped crude oil, crude oil, vacuum gas oil, a heavy distillate refiner product, slop oil, a fuel oil, and any combination thereof, and further wherein the composition lowers the pour point of the hydrocarbon by about 3° C. to about 15° C.

* * * * *